US009213156B2

(12) United States Patent
Amit

(10) Patent No.: US 9,213,156 B2
(45) Date of Patent: Dec. 15, 2015

(54) OPTICAL RECEIVER WITH REDUCED CAVITY SIZE AND METHODS OF MAKING AND USING THE SAME

(75) Inventor: Moshe Amit, Los Angeles, CA (US)

(73) Assignee: Source Photonics, Inc., Chatsworth, CA (US)

( * ) Notice: Subject to any disclaimer, the term of this patent is extended or adjusted under 35 U.S.C. 154(b) by 652 days.

(21) Appl. No.: 13/212,137

(22) Filed: Aug. 17, 2011

(65) Prior Publication Data

US 2013/0044977 A1     Feb. 21, 2013

(51) Int. Cl.
     *G02B 6/32*          (2006.01)
     *G02B 6/42*          (2006.01)
     *G02B 6/12*          (2006.01)

(52) U.S. Cl.
     CPC ............ *G02B 6/4215* (2013.01); *G02B 6/4206* (2013.01); *G02B 6/4214* (2013.01); *G02B 6/4246* (2013.01); *G02B 6/12002* (2013.01); *G02B 6/12004* (2013.01); *G02B 6/12019* (2013.01); *G02B 6/4201* (2013.01); *Y10T 29/49826* (2015.01)

(58) Field of Classification Search
     CPC ............ G02B 6/4246; G02B 6/12002; G02B 6/12004; G02B 6/12019; G02B 6/4201
     USPC .................... 385/14–15, 31–39, 53
     See application file for complete search history.

(56) References Cited

U.S. PATENT DOCUMENTS

| | | | | |
|---|---|---|---|---|
| 5,408,559 A | * | 4/1995 | Takahashi et al. | 385/89 |
| 5,985,491 A | * | 11/1999 | Kim et al. | 430/4 |
| 6,285,508 B1 | | 9/2001 | Ai et al. | |
| 6,493,121 B1 | * | 12/2002 | Althaus | 398/135 |
| 6,549,692 B1 | * | 4/2003 | Harel et al. | 385/18 |
| 7,016,559 B2 | * | 3/2006 | Kano et al. | 385/14 |
| 7,438,480 B2 | * | 10/2008 | Okada et al. | 385/88 |
| 7,556,439 B2 | * | 7/2009 | Nakanishi et al. | 385/92 |
| 8,639,070 B2 | * | 1/2014 | Neilson et al. | 385/24 |
| 2003/0152336 A1 | * | 8/2003 | Gurevich et al. | 385/88 |
| 2009/0279894 A1 | * | 11/2009 | Pan et al. | 398/79 |

(Continued)

FOREIGN PATENT DOCUMENTS

JP      62-229206 A      10/1987

OTHER PUBLICATIONS

Moshe Amit; "Apparatuses for Reducing the Sensitivity of an Optical Signal to Polarization and Methods of Making and Using the Same"; U.S. Appl. No. 13/193,518, filed Jul. 28, 2011.

(Continued)

*Primary Examiner* — Kaveh Kianni
*Assistant Examiner* — Guy Anderson
(74) *Attorney, Agent, or Firm* — Andrew D. Fortney; Central California IP Group, P.C.

(57) ABSTRACT

Methods for manufacturing and using an optical or optoelectronic device are disclosed. The optical or optoelectronic device and related methods may be useful as an optical or optoelectronic transceiver or for the processing of optical signals. The optical or optoelectronic device generally comprises a light-transmitting medium configured to transmit a first light beam; a light-receiving unit configured to receive and process a focused, reflected light beam; a first mirror or beam splitter configured to reflect at least a first portion of the transmitted light beam away from the light-receiving unit; a lens configured to focus the reflected light beam; and a second mirror configured to reflect the focused, reflected light beam towards the light-receiving unit.

21 Claims, 3 Drawing Sheets

(56) References Cited

U.S. PATENT DOCUMENTS

| | | |
|---|---|---|
| 2010/0209103 A1* | 8/2010 | Sakigawa et al. ............... 398/45 |
| 2011/0043798 A1* | 2/2011 | Markwort et al. ......... 356/237.5 |
| 2011/0058771 A1* | 3/2011 | Lee et al. ........................ 385/33 |
| 2012/0087623 A1* | 4/2012 | Neilson et al. .................. 385/24 |

OTHER PUBLICATIONS

Moshe Amit; "Optical Transmitter Assembly, Optical Transceivers Including the Same, and Methods of Making and Using Such Optical Transmitter Assemblies and Optical Transceivers" U.S. Appl. No. 13/223,150, filed Aug. 31, 2011.

J.M. Trewhella, G.W. Johnson, W.K. Hogan and D.L. Karst; "Evolution of Optical Subassemblies in IBM Data Communication Transceivers"; IBM J. Res. & Dev.; 2003; pp. 251-258; vol. 47, No. 2/3; IBM, US.

Bibliographic Data of JPS62229206 (A); Oct. 8, 1987; "Optical Multiplexing/Demultiplexing Module"; Akihiro Adachi, Rumiko Suganuma and Yoshio Miyake; http://worldwide.espacenet.com.

* cited by examiner (Background)

US 9,213,156 B2

OPTICAL RECEIVER WITH REDUCED CAVITY SIZE AND METHODS OF MAKING AND USING THE SAME

FIELD OF THE INVENTION

The present invention generally relates to optical signal reception, and optionally, optical signal transmission. More specifically, embodiments of the present invention pertain to methods and apparatuses for receiving an optical signal using a light-processing cavity having a reduced size.

DISCUSSION OF THE BACKGROUND

FIG. 1 shows a portion of a conventional optical transceiver 100 having a housing 180. The optical transceiver 100 comprises a light-carrying medium 130 (e.g., an optical fiber) which transmits a received optical signal towards a beam splitter 140. At least a portion of the optical signal is reflected by beam splitter 140 towards a ball lens 150. The reflected portion of the light passes through the lens 150 and is received by a light-receiving unit 110 (e.g., a photodiode). The lens 150 is positioned in a lens cap 155. Thus, the housing 180 encompasses a light processing cavity in the optical transceiver 100.

The transceiver 100 further comprises a transmitter 120 and an optical fiber 130 surrounded by a sheath 135. The light-receiving unit 110 must be located in a portion of optical transceiver 100 that is orthogonal to and extends away from the transceiver 120 and sheath 135.

FIG. 2 shows a conventional optical transceiver 200 with a conventional package, including a receiver portion 210, a transmitter portion 220, an optical fiber 235, an optical fiber connection housing 240, and a transceiver housing 280 which encompasses the conventional optical transceiver portion 100 of FIG. 1, including the light processing cavity. Each of the receiver portion 210 and the transmitter portion 220 are fitted with four pins, a power supply pin 212 or 222, a ground pin 214 or 224, a data pin 216 or 226, and a complementary data pin (not shown, but generally behind the data pin 216 or 226). The width and thickness dimensions of transceiver housing 280 have a significant impact on the profile of optical transceiver 200.

As shown in FIG. 1, a dimension L1 of optical transceiver 100 and/or housing 180 may be relatively large, compared to the optical fiber connection housing 280 and transceiver 220 (FIG. 2). Relatively large cross-sectional dimensions may be required for the housing 180 to house or encompass the components of optical transceiver 100, based upon their arrangement in FIG. 1.

However, the optical and optoelectronic network equipment industries seek ever-smaller transceiver packages and/or consumption of less space by functional components in the transceiver. Smaller packages enable more form-fitting network components, and smaller space consumption enables more functionality to be included within the same size package.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure

SUMMARY OF THE INVENTION

The present invention is directed to an optical device that can reduce the space consumed by optical signal processing components, thereby reducing the size of optical and optoelectronic devices such as optical and optoelectronic transceivers.

Embodiments of the present invention relate to an optical device, methods for making the optical device, and a method of processing an optical signal (for example, using the device). The optical device generally comprises a light-transmitting medium configured to transmit a first light beam; a light-receiving unit configured to receive and process a focused, reflected light beam; a first mirror or beam splitter configured to reflect at least a first portion of the transmitted light beam away from the light-receiving unit; a lens configured to focus the reflected light beam; and a second mirror configured to reflect the focused, reflected light beam towards the light-receiving unit.

In various embodiments, the optical device may further comprise (i) a third mirror configured to reflect the reflected light beam towards the second mirror and/or (ii) a light-transmitting unit configured to transmit a second light beam through the first mirror or beam splitter. In one architecture and/or arrangement, the second mirror may be positioned such that a first straight line between the second mirror and the light-receiving unit crosses a second straight line between the light-transmitting medium and the first mirror or beam splitter.

The method of manufacturing the optical device generally comprises affixing a light-transmitting medium in a housing of the optical device or into an opening in the housing of the optical device, the light-transmitting medium being configured to transmit a first light beam; affixing or adhering a light-receiving unit to the housing, the light-receiving unit being configured to receive and process a focused, reflected light beam; affixing or securing a first mirror or beam splitter within the housing, the first mirror or beam splitter being configured to reflect at least a first portion of the transmitted light beam away from the light-receiving unit; affixing or mounting a lens to or in the housing, the lens configured to focus the reflected light beam; and affixing a second mirror within the housing in a position configured to reflect the focused, reflected light beam towards the light-receiving unit.

In various embodiments, the method of manufacturing the optical device may further comprise (1) affixing a light-transmitting unit in the housing or into an opening in the housing, the light-transmitting unit being configured to transmit a second light beam through the first mirror or beam splitter, the second light beam (i) being received by the light-transmitting unit and (ii) having a wavelength different from that of the first light beam, and/or (2) filtering the reflected light beam. In one example, the light-receiving unit comprises a photodiode, and in one architecture and/or arrangement, the light-receiving unit may be positioned at a side of the light-transmitting medium opposite from the second mirror.

The method of processing an optical signal generally comprises receiving a first light beam from a light-transmitting medium; reflecting at least a first portion of the light beam away from a light-receiving unit; passing the reflected light beam through a lens to focus the reflected light beam; reflecting the reflected light beam towards the light-receiving unit; and receiving the focused, reflected light beam in the light-receiving unit. In various embodiments, the method of processing the optical signal may comprise reflecting the first portion of the light beam using a first mirror or beam splitter, and reflecting the reflected light beam towards the light-receiving unit using a second mirror. In one example, the sum of (i) an angle of incidence of the light beam upon the first mirror or beam splitter and (ii) an angle of incidence of the reflected light beam upon the second mirror is about 45°. In further embodiments, the light-transmitting medium may comprise an optical fiber having an unsheathed end proximate to the light-receiving unit.

Various embodiments and/or examples disclosed herein may be combined with other embodiments and/or examples, as long as such a combination is not explicitly disclosed herein as being unfavorable, undesirable or disadvantageous.

The present invention advantageously provides an optical receiver or transceiver with a reduced cavity size, enabling smaller sized packages and/or more functionality to be included within a similar sized package. By arranging components of an optical device according to the present invention (e.g., "folding" a light beam away from a light-receiving unit, in space that might otherwise be unused in the transceiver), the present invention enables an optical device to have a smaller, more compact design.

These and other advantages of the present invention will become readily apparent from the detailed description of various embodiments below.

DETAILED DESCRIPTION

Figure 1:
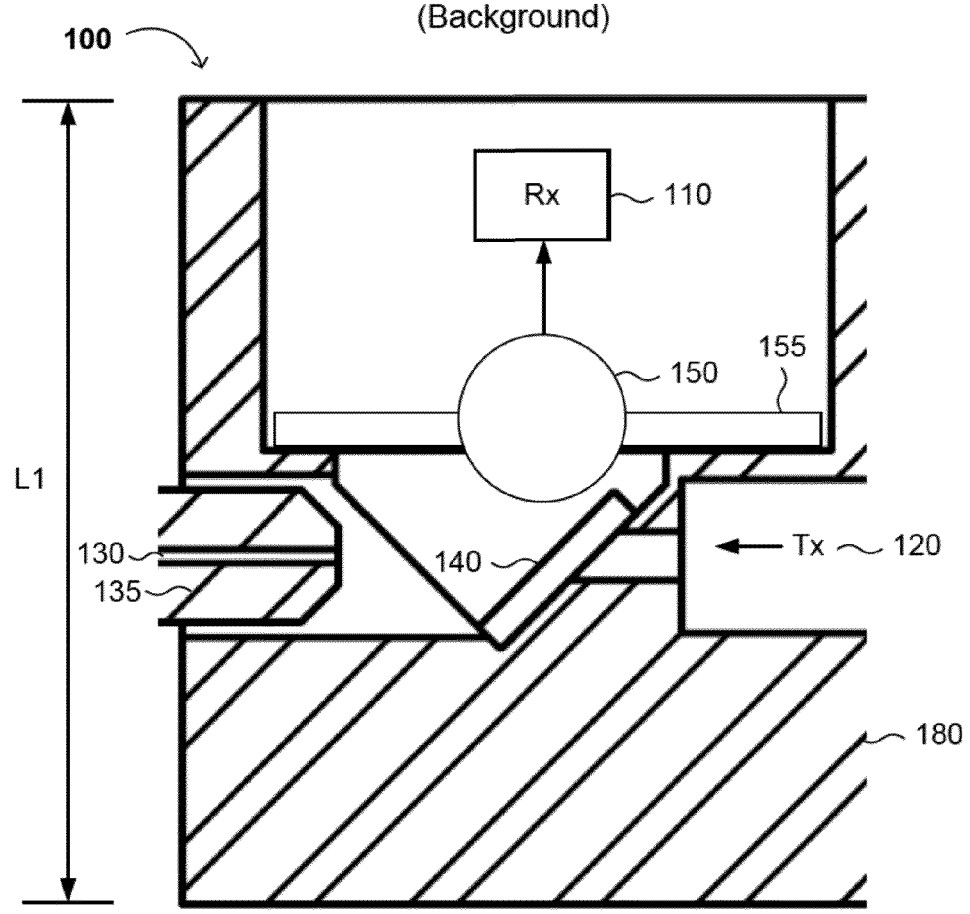
FIG. 1 is a diagram showing part of a conventional optical transceiver.
Figure 2:
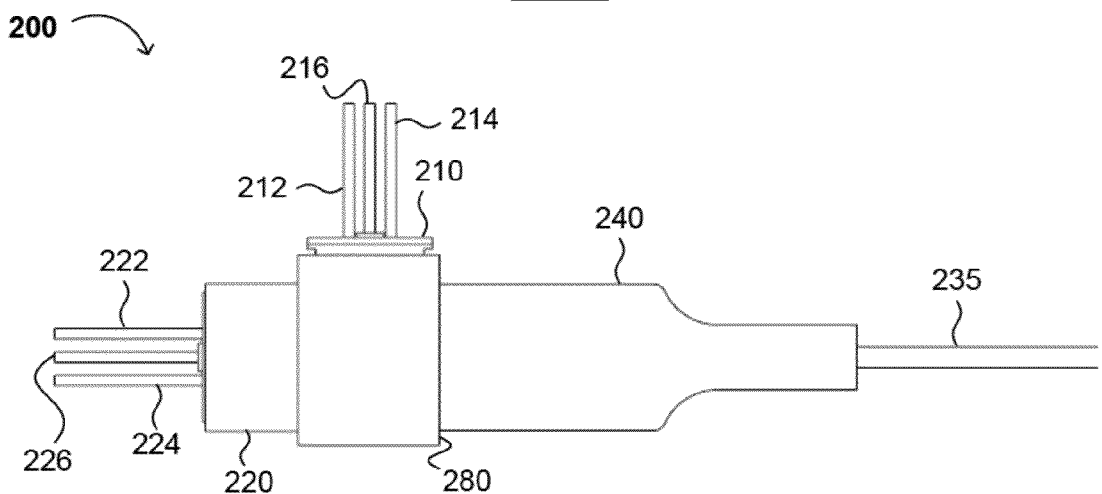
FIG. 2 is a diagram showing an external housing for a conventional optical transceiver.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The present invention concerns an optical device, generally comprising a light-transmitting medium configured to transmit a first light beam; a light-receiving unit configured to receive and process a focused, reflected light beam; a first mirror or beam splitter configured to reflect at least a first portion of the transmitted light beam away from the light-receiving unit; a lens configured to focus the reflected light beam; and a second mirror configured to reflect the focused, reflected light beam towards the light-receiving unit.

A further aspect of the invention concerns a method of manufacturing an optical device, generally comprising the steps of affixing a light-transmitting medium in a housing of the optical device or into an opening in the housing of the optical device, the light-transmitting medium configured to transmit a first light beam; affixing or adhering a light-receiving unit to the housing, the light-receiving unit configured to receive and process a focused, reflected light beam; affixing or securing a first mirror or beam splitter within the housing, the first mirror or beam splitter configured to reflect at least a first portion of the transmitted light beam away from the light-receiving unit; affixing or mounting a lens to or in the housing, the lens configured to focus the reflected light beam; and affixing a second mirror within the housing in a position configured to reflect the focused, reflected light beam towards the light-receiving unit.

Even further aspects of the invention concern a method of processing an optical signal, generally comprising receiving a first light beam from a light-transmitting medium; reflecting at least a first portion of the light beam away from a light-receiving unit; passing the reflected light beam through a lens to focus the reflected light beam; reflecting the focused, reflected light beam towards the light-receiving unit; and receiving the focused, reflected light beam in the light-receiving unit.

The invention, in its various aspects, will be explained in greater detail below with regard to exemplary embodiments.

An Exemplary Optical Device

Figure 3A:
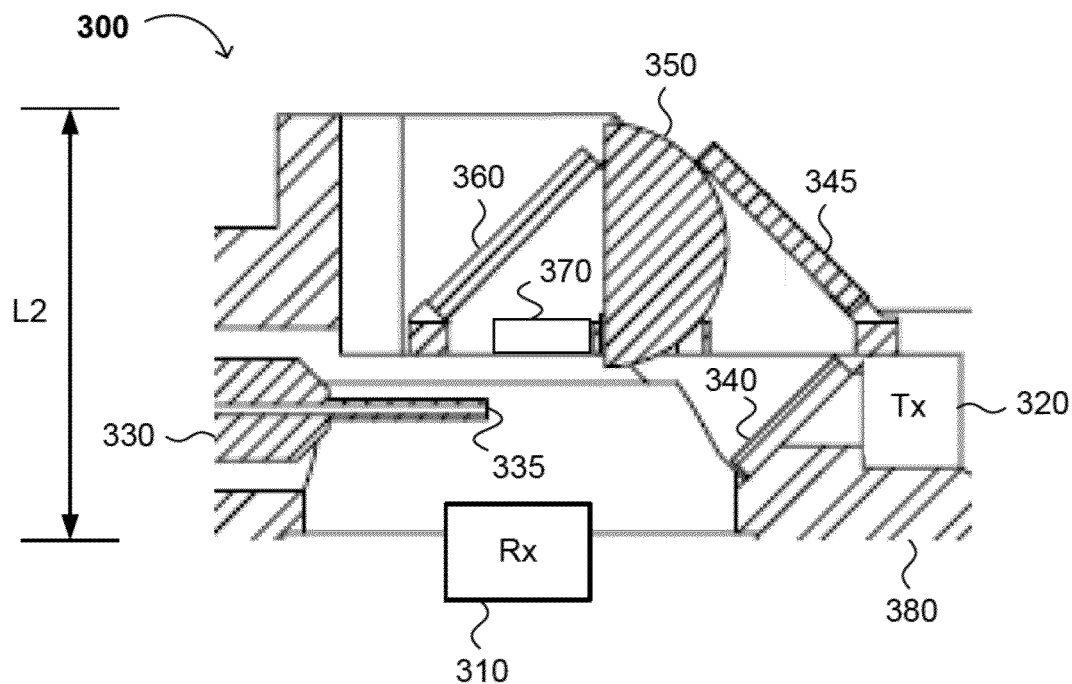
FIG. 3A is a diagram showing an exemplary optical device according to the present invention.

FIG. 3A shows an exemplary optical device 300 according to the present invention. Optical device 300 may be an optical transceiver or other device capable of receiving and processing an optical signal. Optical device 300 may comprise or be contained within a housing 380. The housing 380 may have an opening through which a light-carrying or light-transmitting medium 335 is placed. The light-transmitting medium 335 may comprise an optical fiber which may be surrounded (or sheathed) by a ceramic material 330. A portion of the optical fiber may be uncovered (or unsheathed) at an end closest to a light-receiving unit 310. The light-carrying or light-transmitting medium 335 may be configured to carry or transmit a light beam or optical signal. Typically, the light beam or optical signal is a diffuse light beam or optical signal (e.g., slightly cone-shaped and/or having a characteristic enlargement or spreading of the beam size, width or diameter as a function of distance), but the invention is also applicable to other light beams or optical signals, such as polarized and/or collimated light beams or optical signals. In many embodiments, more than one signal may be simultaneously carried or transmitted by the light-transmitting medium 335, each signal having a different wavelength. For example, a first signal at a first wavelength or wavelength band may be received by optical device 300, and a second signal at a second wavelength or wavelength band significantly different from the first wavelength or wavelength band may be transmitted by optical device 300.

The optical device 300 comprises a first beam splitter 340 configured to reflect at least a portion of the light beam emitted from light-transmitting medium 335. First beam splitter 340 and light-transmitting medium 335 may be aligned such that the light beam transmitted by light-transmitting medium 335 is incident upon first beam splitter 340. In one embodiment, the angle of incidence of the transmitted light beam upon first beam splitter 340 may be about 45° (e.g., exactly 45°). When the optical device includes a receiver that does not have a transmitter (e.g., 320) aligned with the light-transmitting medium (e.g., 335), the beam splitter 340 may be or comprise a mirror.

First beam splitter 340 reflects at least a portion of the light beam away from the light-receiving unit 310 (see, e.g., FIG.

3B). The reflected portion of the light beam may comprise light of a first wavelength. In one embodiment, all light transmitted from the light-transmitting medium 335 to the first beam splitter 340 is reflected. First beam splitter 340 may also allow a second beam (or a second portion of the incident light beam) to pass through. The light which passes through first beam splitter 340 generally comprises light of a second wavelength, where the second wavelength is different from the first wavelength. The first and second wavelengths may differ by a minimum of about 100-200 nm, generally up to about 500-1000 nm. Alternatively, the first and second wavelengths may differ by at least about 5, 10, 15 or 20%, up to as much as 25, 50 or 100%. In various embodiments, the first beam splitter 340 may comprise a dichroic mirror, a wavelength selective filter (made of or coated with a reflective material), a polarization component, an amplitude modulation mask, a phase modulation mask, a hologram, and/or a grating.

The optical device 300 may further comprise a light-transmitting unit 320 which may be configured to transmit light that passes through first beam splitter 340. Light-transmitting unit 320 and light-transmitting medium 335 may be aligned such that the light beam or optical signal transmitted by light-transmitting unit 320 enters or is incident upon the end of light-transmitting medium 335. Light-transmitting unit 320 may be configured to transmit a second light beam or optical signal through first beam splitter 340, the second light beam being received by the light-transmitting medium 335. In other words, optical device 300 may be configured as a bi-directional (BIDI) optical device. Alternatively, a second portion of the light beam emitted the light-carrying medium 335 towards the first beam splitter 340 may pass through the first beam splitter 340 and be received by a second light-receiving unit (not shown). However, in the case where the light beam emitted the light-carrying medium 335 is diffuse, the portion of the light beam passing through the first beam splitter 340 should be focused by a second lens before being reflected by a mirror or beam splitter in a second light-processing unit (not shown) substantially similar to that shown in FIG. 3A.

The optical device 300 may also comprise mirrors 345 and 360 (which may be referred to as, for example, intermediate mirror 345 and final mirror 360) configured to reflect light from first beam splitter 340 towards the light-receiving unit 310. In one embodiment, the angle of incidence of the reflected light beam upon intermediate mirror 345 may be about 45° (e.g., exactly 45°). Intermediate mirror 345 may be positioned at an angle of about 90° (e.g., exactly 90°) with respect to first beam splitter 340.

Final mirror 360 may be configured to reflect the light beam towards the light-receiving unit 310. The light beam which is incident upon final mirror 360 may be the focused light beam which has passed through lens 350. Final mirror 360 may be positioned at an angle of about 90° (e.g., exactly 90°) with respect to intermediate mirror 345. Final mirror 360 may be positioned such that a light beam reflected from final mirror 360 is in a direct path toward light-receiving unit 310.

Figure 3B:
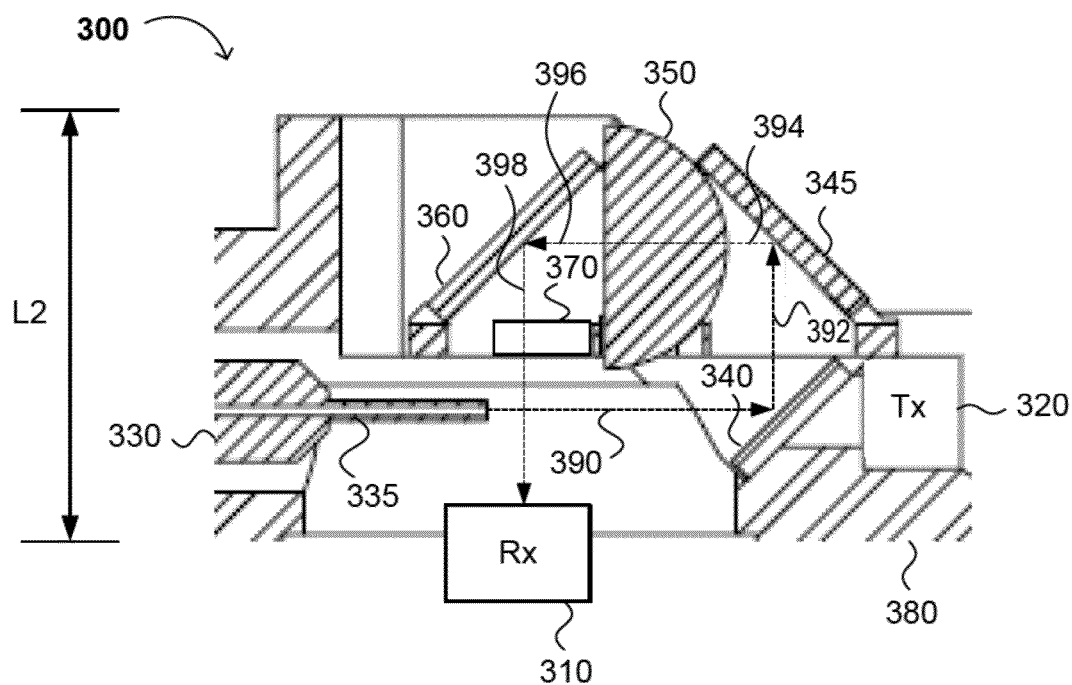
FIG. 3B is a diagram showing a use of the exemplary optical device of FIG. 3A according to aspects of the present invention.

The optical device 300 may also comprise a lens 350 configured to focus the reflected light beam (see, e.g., FIG. 3B). The lens 350 may focus the received and/or incident light that passes through the lens 350, and is thus particularly advantageous when the received light beam 390 is a diffuse light beam. Lens 350 may be a half ball lens, which may comprise a curved surface facing intermediate mirror 345 and a flat surface facing final mirror 360. Alternatively, the lens may comprise a concave lens, a convex lens, and/or a combination of concave or convex lenses. Lens 350 can be placed anywhere in the light path (e.g., between first beam splitter 340 and intermediate mirror 345, between final mirror 360 and light-receiving unit 310, etc.), but doing so may affect the extent of the cavity size reduction and, when the light beam is diffuse, the diameter or width of the light beam at certain points in the device 300 (e.g., as it enters the receiver 310).

The optical device 300 may also comprise a filter 370 between final mirror 360 and light-receiving unit 310, configured to filter (e.g., reduce the wavelength band of) the light beam traveling between final mirror 360 and light-receiving unit 310. Filter 370 may comprise material(s) known in the art that are capable of blocking certain predetermined wavelengths of light from passing through. The filter 370 can be placed elsewhere along the light path (see, e.g., FIG. 3B). For example, filter 370 may be placed between first beam splitter 340 and intermediate mirror 345, between lens 350 and final mirror 360, or attached to, affixed to or integrated within the lens 350, etc.

The optical device 300 may also comprise a light-receiving unit 310. The light-receiving unit 310 may comprise (1) a photodiode (e.g., a PIN photodiode) or other light-detecting component(s) and (2) an amplifier (e.g., a transimpedence amplifier and/or a limiting amplifier). The light-receiving unit 310 may be positioned at a side of the light-transmitting medium 335 opposite from final mirror 360. Light-receiving unit 310 may be configured to receive the light beam from final mirror 360.

Thus, due to the arrangement of optical device 300 of FIG. 3A, the dimension L2 of optical transceiver 300 and/or housing 380 may be relatively small, as compared to the dimension L1 of FIG. 1. A relatively small cross-sectional dimension enables the housing 380 to have a smaller profile, fit in a smaller package, and/or house or encompass additional components (and thus additional functionality) within optical device 300.

FIG. 3B shows a path that a light beam may take within the light processing cavity of optical device 300 of FIG. 3A. Referring to FIG. 3B, a light beam (or optical signal) 390 may be emitted from light-transmitting medium 335, after which the light beam 390 is incident upon first beam splitter 340, where it is reflected in whole or in part towards intermediate mirror 345 as reflected light beam 392. Intermediate mirror 345 reflects the light beam 392 through lens 350, which focuses the reflected light beam 394. When the light beam 392 is diffuse, light beam 394 will have a smaller size, width or diameter than light beam 392. The focused light beam 396 is incident upon final mirror 360, which reflects the focused light beam 396 towards light-receiving unit 310. The focused, reflected light beam 398 is received in or on the light-receiving unit 310 after passing through filter 370.

As shown in FIG. 3B, the components of optical device 300 may be arranged such that a first straight line between the final mirror 360 and the light-receiving unit 310 crosses a second straight line between the light-transmitting medium 335 and the first beam splitter 340. The first and second straight lines may be perpendicular to each other (e.g., may cross each other at right angles). A third straight line between final mirror 360 and intermediate mirror 345 may be parallel to the second straight line between the light-transmitting medium 335 and the first beam splitter 340. A fourth straight line between intermediate mirror 345 and first beam splitter 340 may be parallel to the first straight line between the final mirror 360 and the light-receiving unit 310.

The lens 350 may be in the path of the third straight line between final mirror 360 and intermediate mirror 345. Alternatively, lens 350 may be in the path of the first straight line between final mirror 360 and receiver 310 (e.g., it may be mounted on receiver 310), or in the path of the fourth straight line between first beam splitter 340 and intermediate mirror 345. In the case where final mirror 360 comprises a dichroic mirror, wavelength selective filter, polarization component, amplitude and/or phase modulation mask, hologram and/or grating, intermediate mirror 345 may be on the second straight line, on a side of the final mirror 360 opposite from the light-receiving unit 310. Light-transmitting unit 320 may be on the first straight line at a side of the first beam splitter 340 opposite from the light-transmitting medium 335.

An Alternative Optical Device

Figure 4A:
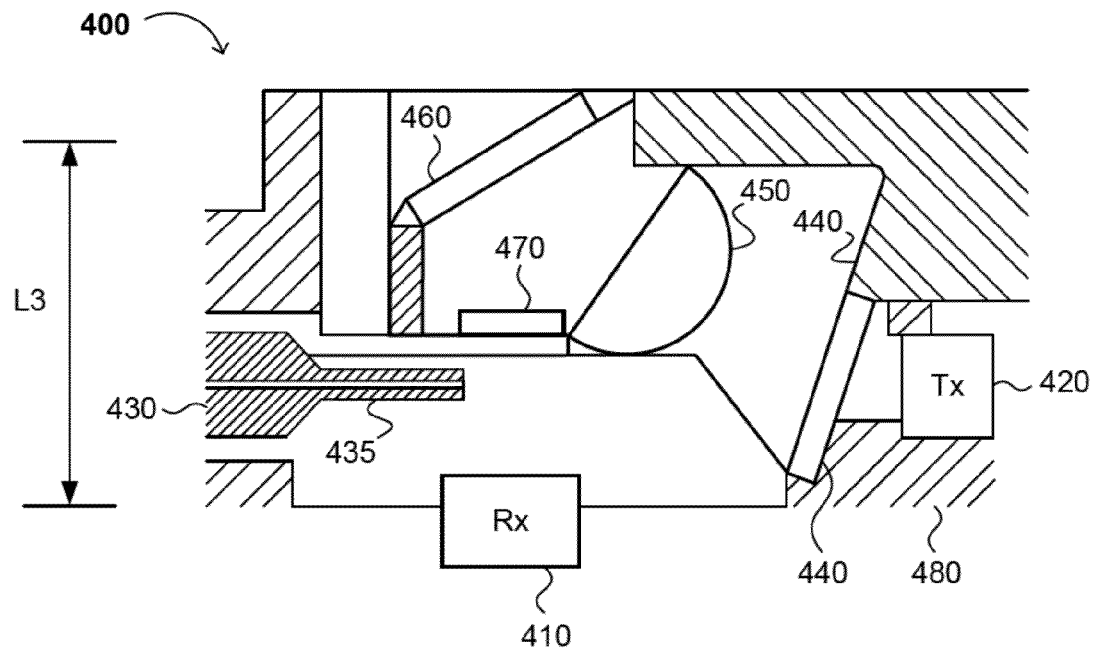
FIG. 4A is a diagram showing an alternative optical device in accordance with additional aspects of the present invention.

FIG. 4A shows an alternative optical device (e.g., an optical transceiver) 400 in accordance with additional aspects of the present invention. Optical device 400 may comprise or be contained within a housing 480. Optical device 400 may comprise a light-transmitting medium 435 having a sheath 430, a light-receiving unit 410, a first beam splitter 440, a light-transmitting unit 420, a lens 450, a second mirror 460, and a filter 470 in an arrangement similar to optical device 300 (see FIG. 3A). However, as shown in FIG. 4A, optical device 400 includes only two mirrors (or a mirror and a beam splitter).

For example, first beam splitter 440 and light-transmitting medium 435 may be aligned such that the light beam transmitted by light-transmitting medium 435 is incident upon beam splitter 440 at an angle of about 13° (e.g., 13±0.5° [or any positive amount less than 0.5°], and in one embodiment, exactly 13°). Such an angle of incidence of the first beam splitter 440 may be advantageous in the case where the received light beam (e.g., light beam 490 in FIG. 4B) is polarized and/or collimated, but the optical device 400 is also effective and advantageous when the received light beam is diffuse. Second mirror 460 and first beam splitter 440 may be aligned such that the light beam reflected by first beam splitter 440 is incident upon second mirror 460 at an angle of about 32° (e.g., 32±0.5° [or any positive amount less than 0.5°], and in the same embodiment, exactly 32°). Thus, a sum of (i) an angle of incidence of the light beam upon the first beam splitter 440 and (ii) an angle of incidence of the light beam upon the second mirror 450 may equal about 45° (e.g., 45±0.5° [or any positive amount less than 0.5°], and in the embodiment shown in FIG. 4A, exactly 45°).

Similar to optical device 300 in FIG. 3A, due to the arrangement of components within the optical device 400 of FIG. 4A, a dimension L3 of optical transceiver 400 and/or housing 480 may be relatively small, compared to the dimension L1 of FIG. 1 and the dimension L2 of FIG. 3A. A relatively small cross-sectional dimension enables the housing 480 to have a smaller profile, fit in a smaller package, and/or house or encompass additional components within optical device 400.

Figure 4B:
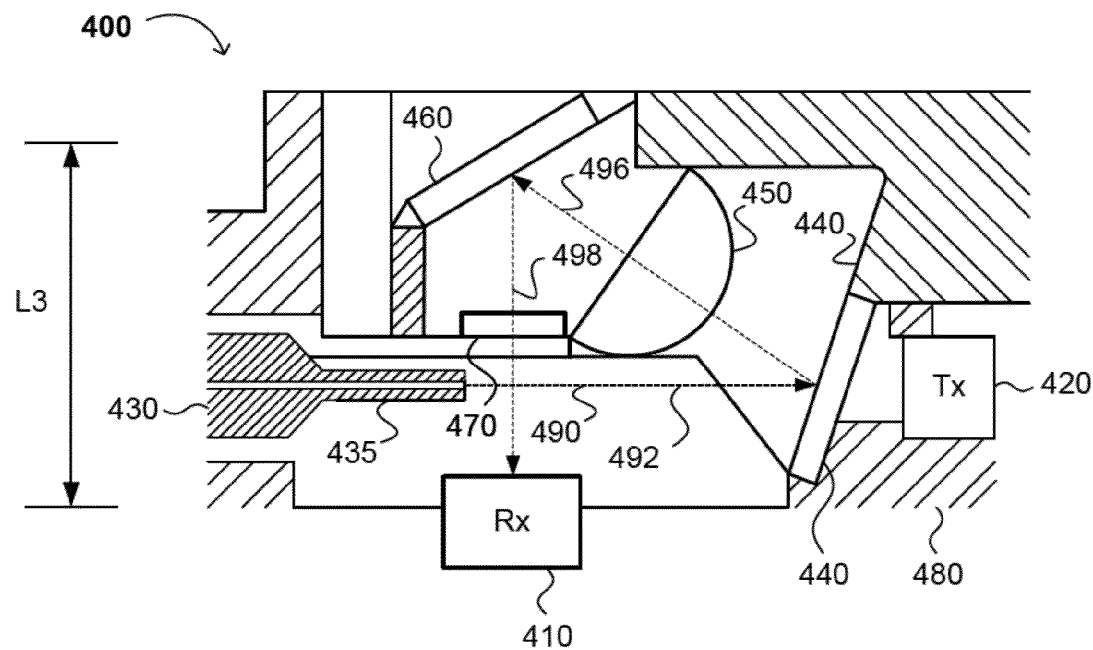
FIG. 4B is a diagram showing a use of the alternative optical device of FIG. 4A.

FIG. 4B shows a path that a light beam may take in the optical device of FIG. 4A (i.e., optical device 400). Referring to FIG. 4B, a light beam (or optical signal) 490 may emanate from light-transmitting medium 435, after which the light beam 490 is incident upon first beam splitter 440, where it is reflected in whole or in part towards lens 450 as reflected light beam 492. After passing through lens 450, the focused light beam 496 is incident upon second mirror 460, which reflects the light beam 496 towards light-receiving unit 410, wherein the reflected, focused light beam 498 is received in or at the light-receiving unit 410.

As shown in FIG. 4B, the components of optical device 400 may be arranged such that a first straight line between the second mirror 460 and the light-receiving unit 410 crosses a second straight line between the light-transmitting medium 435 and the first beam splitter 440. The first and second straight lines may be perpendicular to each other (e.g., may cross each other at right angles). A third straight line between second mirror 460 and first beam splitter 440 may be neither parallel nor perpendicular to either the first straight line or the second straight line, but may be normal or perpendicular to the surface of the lens 450 (e.g., the planar surface of half-ball lens 450). Thus, the lens 450 may be in the path of the third straight line between second mirror 460 and first beam splitter 440. Second mirror 460 may be at an opposite side of the second straight line from the light receiving unit 410. Light-transmitting unit 420 and first beam splitter 440 may be at an opposite side of the first straight line from the light-transmitting medium 435.

CONCLUSION/SUMMARY

Thus, the present invention provides an optical device, methods for making the optical device, and a method of processing an optical signal (for example, processing the optical signal using the device).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical device, comprising:
   a light-transmitting medium configured to transmit a first light beam;
   a light-receiving unit comprising a photodiode, configured to receive and process a focused, reflected light beam;
   a first mirror or beam splitter configured to reflect at least a first portion of the transmitted light beam away from the light-receiving unit;
   a lens configured to focus the reflected light beam;
   a second mirror configured to reflect the focused, reflected light beam towards the light-receiving unit; and
   a housing having an opening that receives the light-transmitting medium, wherein the housing contains the first mirror or beam splitter, the lens, and the second mirror.

2. The device of claim 1, further comprising a third mirror within the housing configured to reflect the reflected light beam towards the second mirror.

3. The device of claim 2, wherein the first mirror or beam splitter is oriented at about a 45 degree angle relative to the transmitted light beam, the third mirror is oriented at about a 90 degree angle relative to the first mirror or beam splitter, and the second mirror is oriented at about a 90 degree angle relative to the third mirror.

4. The device of claim 2, wherein the lens is between the third mirror and the second mirror.

5. The device of claim 1, wherein a sum of (i) an angle of incidence of the transmitted light beam upon the first mirror or beam splitter and (ii) an angle of incidence of the reflected light beam upon the second mirror is about 45°.

6. The device of claim 1, further comprising a light-transmitting unit configured to transmit a second light beam through the first mirror or beam splitter, wherein:
   the first portion of the transmitted light beam has a first wavelength;

the second light beam (i) is received by the light-transmitting medium and (ii) has a wavelength different from that of the first wavelength; and the light-transmitting unit is affixed or adhered to the housing, or the housing further contains the light-transmitting unit.

7. The device of claim 1, wherein:
the light-transmitting medium comprises an optical fiber; and
a portion of the optical fiber at an end of the optical fiber proximate to said light-receiving unit is unsheathed.

8. The device of claim 1, wherein the second mirror is positioned such that a first straight line between the second mirror and the light-receiving unit crosses a second straight line between the light-transmitting medium and the first mirror or beam splitter.

9. The device of claim 1, wherein the reflected light beam passes through the lens.

10. The device of claim 1, wherein the received light beam is a diffuse light beam.

11. The device of claim 1, further comprising a filter along a light path of the reflected light beam or the focused, reflected light beam, configured to filter the reflected light beam or the focused, reflected light beam.

12. The device of claim 11, wherein the filter is between the second mirror and the light-receiving unit, and is configured to reduce the wavelength band of the focused, reflected light beam.

13. The device of claim 1, wherein the light-receiving unit is affixed or adhered to the housing, or the housing further contains the light-receiving unit.

14. A method of processing an optical signal, comprising:
receiving a first light beam from a light-transmitting medium in an opening in a housing of an optical device, wherein the opening receives the light-transmitting medium;
reflecting at least a first portion of the light beam away from a light-receiving unit using a first mirror or beam splitter, wherein the light-receiving unit comprises a photodiode, and the housing contains the first mirror or beam splitter;
passing the reflected light beam through a lens to focus the reflected light beam, wherein the housing further contains the lens;
reflecting the focused, reflected light beam towards the light-receiving unit using a second mirror, wherein the housing further contains the second mirror; and
receiving the focused, reflected light beam in the light-receiving unit.

15. The method of claim 14, wherein:
at least the first portion of the light beam is reflected by a first mirror or beam splitter oriented at about a 45 degree angle relative to the light beam; and
the reflected light beam is reflected towards the light-receiving unit by a second mirror oriented at about a 45 degree angle relative to an incident light beam; and
the method further comprises reflecting the reflected portion of the light beam towards the second mirror using a third mirror oriented at a 90 degree angle relative to the first mirror or beam splitter.

16. The method of claim 15, further comprising transmitting a second light beam through the first mirror or beam splitter, the second light beam being received by the light-transmitting medium.

17. The method of claim 14, wherein:
at least the first portion of the light beam is reflected by a first mirror or beam splitter; and
the reflected light beam is reflected towards the light-receiving unit by a second mirror; and
a sum of (i) an angle of incidence of the light beam upon the first mirror or beam splitter and (ii) an angle of incidence of the reflected light beam upon the second mirror is about 45°.

18. The method of claim 17, wherein the angle of incidence of the light beam upon the first mirror or beam splitter is about 13±0.5°, and an angle of incidence of the reflected light beam upon the second mirror is about 32±0.5°.

19. The method of claim 14, wherein:
the light-transmitting medium comprises an optical fiber having an unsheathed end proximate to said light-receiving unit;
the second mirror is positioned such that a first straight line between the second mirror and the light-receiving unit crosses a second straight line between the light-transmitting medium and the first mirror or beam splitter; and
the light-receiving unit is at a side of the light-transmitting medium opposite from the second mirror.

20. The method of claim 14, further comprising filtering the reflected light beam or the focused, reflected light beam, configured to filter the reflected light beam or the focused, reflected light beam.

21. The method of claim 14, wherein the light-receiving unit is affixed or adhered to the housing, or the housing further contains the light-receiving unit.

\* \* \* \* \*